United States Patent [19]

Hambrecht et al.

[11] Patent Number: 4,762,874

[45] Date of Patent: * Aug. 9, 1988

[54] THERMOPLASTIC MOLDING MATERIALS

[75] Inventors: Juergen Hambrecht, Heidelberg; Karl H. Illers, Otterstadt; Adolf Echte; Johann Swoboda, both of Ludwigshafen, all of Fed. Rep. of Germany

[73] Assignee: BASF Aktiengesellschaft, Ludwigshafen, Fed. Rep. of Germany

[*] Notice: The portion of the term of this patent subsequent to Aug. 5, 2003 has been disclaimed.

[21] Appl. No.: 837,646

[22] Filed: Mar. 5, 1986

Related U.S. Application Data

[63] Continuation of Ser. No. 682,069, Dec. 17, 1984, abandoned.

[30] Foreign Application Priority Data

Dec. 22, 1983 [DE] Fed. Rep. of Germany ....... 3346303

[51] Int. Cl.$^4$ .......................... C08K 5/51; C08L 71/04
[52] U.S. Cl. ...................................... 524/151; 525/68; 525/132; 525/905
[58] Field of Search ................... 525/68, 905; 524/151

[56] References Cited

U.S. PATENT DOCUMENTS

| | | |
|---|---|---|
| 3,383,435 | 5/1968 | Cizek . |
| 4,128,602 | 12/1978 | Katchman et al. ................... 525/68 |
| 4,311,633 | 1/1982 | Lee, Jr. ............................. 260/42.18 |
| 4,360,618 | 11/1982 | Trementozzi . |
| 4,604,415 | 8/1986 | Hambrecht et al. ................... 525/68 |

FOREIGN PATENT DOCUMENTS

| | | |
|---|---|---|
| 649166 | 1/1951 | United Kingdom . |
| 1562540 | 3/1980 | United Kingdom ................... 25/14 |

Primary Examiner—Jacob Ziegler
Attorney, Agent, or Firm—Keil & Weinkauf

[57] ABSTRACT

Thermoplastic molding materials contain a blend of a polyphenylene ether with a copolymer which consists of monovinyl-aromatic monomers, alkyl methacrylates where alkyl is of not more than 8 carbon atoms and, if required, an elastomer component having a glass transition temperature of $\leq 0°$ C.

7 Claims, No Drawings

THERMOPLASTIC MOLDING MATERIALS

This application is a continuation of application Ser. No. 682,069, filed on Dec. 17, 1984, now abandoned.

The present invention relates to thermoplastic molding materials which are based on polyphenylene ethers and styrene/methyl methacrylate copolymers and may or may not have been toughened.

Blends of polyphenylene ethers and styrene polymers are known, and have been described in a number of patents. The relevant prior art includes (1) U.S. Pat. No. 3,383,435, (2) German Laid-Open Application DOS No. 2,713,430, (3) U.S. Pat. No. 4,360,618, (4) European Pat. No. 55,473 and (5) German Laid-Open Application DOS No. 3,127,233.

(1) describes compositions comprising polyphenylene ethers and styrene resins. Either the latter can be modified with rubber, generally polybutadiene, or pure polystyrene can be used. However, the heat resistance and the mechanical properties of these blends, and their resistance to chemicals, frequently do not meet the requirements set.

If the styrene resin in (1) is replaced by styrene/maleic anhydride copolymers (S-MAA), as described in (2), the heat distortion resistance of the blends, and their resistance to chemicals, can be improved, but the mechanical properties of the blends obtained are unsatisfactory.

(3) describes blends of polyphenylene ethers and styrene/acrylonitrile copolymers which possess high rigidity and very good resistance to chemicals. However, the toughness and the heat distortion resistance are not completely satisfactory.

Blends of polyphenylene ethers and copolymers of olefins and glycidyl acrylates or methacrylates are described in (4). The addition of this copolymer improves the processability of these blends, but the heat distortion resistance and the rigidity are reduced.

(5) describes blends of polyphenylene ethers, an EPDM polymer, high-impact polystyrene and a styrene/butyl acrylate copolymer. These blends possess good weather resistance as well as good toughness and processability, but their heat distortion resistance, rigidity and resistance to chemicals are also not completely satisfactory.

It is an object of the present invention to provide thermoplastic molding materials which are based on blends of polyphenylene ethers and styrene polymers and which possess sufficiently high heat distortion resistance coupled with good resistance to chemicals and well balanced mechanical properties.

We have found that this object is achieved, in accordance with the invention, by molding materials which contain a mixture of (I) from 95 to 5% by weight of a polyphenylene ether and
(II) from 5 to 95% by weight of a copolymer consisting of
   ($A_1$) from 85 to 99 parts by weight of a monovinylaromatic monomer,
   ($A_2$) from 1 to 5 parts by weight of an alkyl methacrylate where alkyl is of not more than 8 carbon atoms, and
   (B) from 0 to 20 parts by weight of an elastomer component which has a glass transition temperature of $\leq 0°$ C., the sum of the number of parts by weight being 100.

The components of the novel molding material, their preparation, and the preparation of the molding material are described below.

COMPONENT I

Component I of the novel molding material comprises one or more resins which are composed of a polyphenylene ether (PPE) and are present in amounts of from 95 to 5, preferably from 70 to 30, % by weight, based on the mixture of I and II.

The polyethers are compounds which are based on polyphenylene oxides disubstituted in the ortho-position, the ether oxygen of one unit being bonded to the benzene nucleus of the adjacent unit. Not less than 50 units should be bonded to one another in this way. The polyethers can carry, in the ortho-position to the oxygen, hydrogen, halogen, a hydrocarbon radical which does not possess a tertiary α-hydrogen atom, a halohydrocarbon, phenyl or a hydrocarbon-oxy radical. Examples are poly(2,6-dichloro-1,4-phenylene)ether, poly(2,6-diphenyl-1,4-phenylene)ether, poly(2,6-dimethoxy-1,4-phenylene)ether, poly(2,6-dimethyl-1,4-phenylene)ether and poly(2,6-dibromo-1,4-phenylene)ether. Poly(2,6-dimethyl-1,4-phenylene)ethers are preferably employed, those having a limiting viscosity of from 0.45 to 0.65 dl/g (measured in chloroform at 30° C.) being particularly preferred.

The polyphenylene ethers can be prepared from the phenols in a conventional manner, for example in the presence of a complex-forming agent, such as copper bromide or sec.-dibutylamine.

COMPONENT II

Component II of the novel molding materials is a styrene/alkyl methacrylate copolymer which may or may not have been toughened and which consists of constituents ($A_1$) and ($A_2$) and, if required, B.

The novel molding materials contain component II in an amount of from 5 to 95, preferably from 30 to 70, % by weight based on the mixture of I and II.

The composition of component II is as follows:

Suitable monovinyl-aromatic monomers ($A_1$) are styrene, α-methylstyrene and styrenes of not more than 12 carbon atoms which are alkylated in the nucleus, particularly preferably styrene, α-methylstyrene and paramethylstyrene.

Suitable monomers ($A_2$) are alkyl methacrylates where alkyl is of not more than 8 carbon atoms. Methyl methacrylate is preferred.

Component II contains from 85 to 99, preferably from 88 to 99, parts by weight of monomer ($A_1$) and from 1 to 15, preferably from 1 to 12, parts by weight of monomer ($A_2$), the sum of the number of parts by weight being 100, unless component B is present.

The constituents of component II are prepared by continuous copolymerization of the monomers ($A_1$) and ($A_2$) at elevated temperatures, while stirring vigorously. The monomers ($A_1$) and ($A_2$) are introduced continuously into a polymerization vessel, and an amount of polymerization mixture equivalent to these amounts is simultaneously removed from the vessel (cf. A. W. Hanson and R. L. Zimmermann, Industrial Eng. Chemistry 49 (1957), 803). However, the constituents $A_1$ and $A_2$ can also be polymerized by any other conventional polymerization method.

CONSTITUENT B

Constituent B of component II is an elastomer component which may or may not be present in the novel molding materials. It is a graft polymer which is present in component II in an amount of from 0 to 20, in particular from 1 to 18, parts by weight, the sum of the number of parts by weight of B, $A_1$ and $(A_2)$ being 100.

This graft copolymer consists of from 10 to 50, preferably from 15 to 45, parts by weight of a mixture of one or more vinyl-aromatic monomers of not more than 12 carbon atoms, and from 0.1 to 25, preferably from 5 to 20, parts by weight of one or more (meth)acrylates and/or acrylonitrile and/or (meth)acrylic acid and/or maleic anhydride as a grafted shell, on 50-90, in particular 60-80, parts by weight of an elastomeric grafting base (rubber component).

This rubber component should have a glass transition temperature (according to K. H. Illers and H. Breuer, Kolloid-Zeitschrift 176 (1961), 110) of below 0° C. Examples of suitable rubbers are polybutadiene (cf. German Laid-Open Applications DOS No. 1,420,775 and DOS No. 1,495,089), copolymers of butadiene and styrene (cf. British Pat. No. 649,166), copolymers of butadiene and styrene and polyacrylates which may or may not be crosslinked (cf. German Published Applications DAS No. 1,138,921, DAS No. 1,224,486 and DAS No. 1,260,135), copolymers of acrylates and butadiene (cf. German Published Application DAS No. 1,238,207), elastomers of copolymers of acrylates with styrene, acrylonitrile and vinyl ethers and copolymers of ethylene with a non-conjugated diene (EPDM rubber), and hydrogenated styrene/butadiene rubber polymers.

The vinyl-aromatic graft monomers are styrene, α-methylstyrene and/or styrenes of not more than 12 carbon atoms which are alkylated in the nucleus; suitable polar monomers are acrylates and methacrylates of alkanols of not more than 8 carbon atoms, acrylonitrile, acrylic acid, methacrylic acid and maleic anhydride, and mixtures of these.

The preparation of the graft copolymers B is known per se. They can be prepared by, for example, polymerization of a mixture of styrene and (meth)acrylates in the presence of a rubber. The graft copolymerization can be carried out in a conventional manner, in solution, in suspension or, preferably, in emulsion.

It is essential for success that the constituents A and B of component II of the novel molding material have a composition, and are matched up with one another in the mixture, so that the absolute amounts of the polar monomers in constituents A and B differ by less than 9.

Component II of the novel molding materials is preferably obtained by mixing melts of constituents A and B. To do this, constituents A and B, in the form of melts, are mixed at from 200° to 260° C. in an extruder, a roll mill or a kneader, the residence time being a few minutes. However, it is also possible to mix solutions of constituent A and of the graft copolymer B, and then to volatilize the solvents.

In addition to containing components I and II, the novel molding material can, if required, contain effective amounts of conventional additives. Examples of such additives are pigments, dyes, fillers, flameproofing agents, such as triaryl phosphates, other compatible polymers, antistatic agents, antioxidants and lubricants.

PREPARATION OF THE NOVEL MOLDING MATERIALS FROM COMPONENTS I AND II

The molding material according to the invention can be prepared from components I and II as described below. However, the molding material is preferably prepared from constituents A and B and component I, with or without other additives, by mixing the soft and hard constituents (of component II) and the polyphenylene ethers. The preparation is usually carried out in an apparatus which permits homogeneous mixing, eg. a kneader, an extruder or a roll mill.

However, it is also possible to prepare the novel molding material by thoroughly mixing solutions of the individual components and then evaporating the solvent. Combined processes in which solutions and melts are mixed, for example in a devolatilization extruder, have also been successfully tested.

The copolymers $A_1$ to $A_3$ listed in Table 1, and where relevant the graft rubbers $B_1$ to $B_3$ stated in Table 2, were used for the preparation of the novel molding materials. Composition and other properties are shown in the stated tables.

A commercial product based on poly(2,6-dimethyl-1,4-phenylene)ether and having a limiting viscosity of 0.5 [dl/g] and a notched impact strength of 3 (kJ/m) was used as component I.

TABLE 1

| | SMMA and SMA copolymers (constituent A) | | | | |
|---|---|---|---|---|---|
| | Composition in parts by weight | | | Notched impact strength | Vicat temperature |
| Name | S | MA | MMA | (kJ/m$^2$) | (°C.) |
| $A_1$ | 95 | — | 5 | 3 | 100 |
| $A_2$ | 89 | — | 11 | 4 | 99 |
| $A_3$ | 84 | — | 16 | 4 | 99 |

S = styrene,
MMA = methyl methacrylate and
MA = methyl acrylate.

The copolymers $A_1$ to $A_3$: had a viscosity number of 70 (ml/g), measured on a 0.5% strength solution in dimethylformamide at 25° C.

TABLE 2

| | Graft copolymers (constituent B) | | | | | Glass transition temperature (°C.) |
|---|---|---|---|---|---|---|
| | Composition of the rubber (%) | | Composition of the grafted shell (%) | | | |
| Name | Bu | BA | S | MMA | AN | |
| $B_1$ | 100 | — | 90 | 10 | — | −81 |
| $B_2$ | — | 100 | 90 | 10 | — | −46 |
| $B_3$ | 50 | 50 | 90 | 5 | 5 | −67 |

Bu = butadiene,
BA = butyl acrylate,
S = styrene,
MMA = methyl methacrylate and
AN = acrylonitrile.

Triphenyl phosphate was employed as component III.

The parameters stated in the experiments and comparative experiments were determined as follows:
1. The notched impact strength in (kJ/m$^2$) was measured according to DIN 53,453, at a material temperature of 250° C., on injection molded standard small bars.
2. The modulus of elasticity in (N/mm$^2$) was determined according to DIN 53,457, on injection molded dumbbell test pieces.
3.

(a) The viscosity numbers, VZ, in (ml/g) were determined for a 0.5% strength solution in dimethylformamide.
(b) The limiting viscosity $\eta sp/c$ in [cm³/g] was measured in CHCl$_3$ at 30° C.

4. The Vicat softening point in °C. was determined according to DIN 53,460, method B, in silicone oil.
5. The glass transition temperatures of the rubbers were determined in accordance with K. H. Illers and H. Breuer, Kolloid-Zeitschrift, loc. cit.
6. The resistance to chemicals was checked and visually assessed in a short-time test with injection molded boxes which were filled with isopropanol and stored for 48 hours.

Rating:
1 = no change
2 = roughening of surface, cloudiness
3 = deformation

The Examples and Comparative Experiments which follow illustrate the invention. Parts and percentages are by weight, unless stated otherwise.

EXAMPLES 1 TO 7 AND COMPARATIVE EXAMPLES I AND II

The components A$_n$ and B$_n$ stated in Table 3 were premixed in a fluid mixer and then kneaded thoroughly in a Ko-kneader at about 220°–230° C., under nitrogen. The residence time was about 4 minutes. The granules obtained were melted in a single-screw extruder, the melt was extruded and the extrudates were face-cut to give uniform granules suitable for injection molding. Table 3 lists the properties of the mixtures.

TABLE 3

| | Composition (% by weight) Components | | | Notched impact strength | Vicat temperature | Modulus of elasticity | Resistance to chemicals |
|---|---|---|---|---|---|---|---|
| | I | II | III | (kJ/m²) | (°C.) | (N/mm²) | Rating |
| Example | | | | | | | |
| 1 | 70 | 30 (100 parts of A$_1$) | — | 6 | 157 | 3000 | 1 |
| 2 | 70 | 30 (100 parts of A$_2$) | — | 7 | 157 | 3100 | 1 |
| 3 | 50 | 50 (100 parts of A$_2$) | — | 7 | 140 | 2900 | 1 |
| 4 | 60 | 40 (75 parts of A$_1$) 25 parts of B$_1$) | — | 12 | 148 | 2700 | 1 |
| 5 | 60 | 40 (75 parts of A$_2$) 25 parts of B$_2$) | — | 13 | 147 | 2800 | 1 |
| 6 | 60 | 40 (75 parts of A$_2$) 25 parts of B$_3$) | — | 13 | 147 | 2800 | 1 |
| 7 | 50 | 40 (75 parts of A$_2$) 25 parts of B$_2$) | 10 | 14 | 123 | 2500 | 1 |
| Comparative Examples (not according to the invention) | | | | | | | |
| I | 70 | 30 (100 parts of A$_3$) | — | 3 | 131 | 3100 | 2 |
| II | 60 | 40 (75 parts of A$_3$) 25 parts of B$_3$) | — | 7 | 124 | 2800 | 3 |

We claim:

1. A thermoplastic molding material which contains a mixture of from 95 to 5% by weight of Component I which is
a polyphenyl ether and
from 5 to 95% by weight of Component II which is a copolymer consisting of
(A$_1$) from 85 to 99 parts by weight of a monovinyl aromatic monomer, and
(A$_2$) from 1 to 15 parts by weight of an alkyl methacrylate where alkyl is of not more than 8 carbon atoms with 1 to 18 parts by weight of
Component III, which is
(B) an elastomer component in the form of a graft copolymer which consists of from 10 to 50 parts by weight of at least one vinyl-aromatic monomer of not more than 12 carbon atoms, and from 0.1 to 25 parts by weight of at least one acrylate, methacrylate, acrylonitrile, methacrylic acid or maleic anhydride, as the grafted shell, on 50 to 90 parts by weight of an elastomeric grafting base having a glass transition temperature of $\leq 0°$ C. the sum of the number of parts by weight of (A$_1$), (A$_2$) and B being 100.

2. A thermoplastic molding material as defined in claim 1, wherein a homopolymer, a copolymer of 2,6-dimethylphenol or mixture thereof are employed as the polyphenylene ether I.

3. A thermoplastic molding material as defined in claim 1, wherein component I is employed in an amount of from 30 to 70% and component II in an amount of from 70 to 30%.

4. A thermoplastic molding material as defined in claim 1, which contains a triaryl phosphate.

5. A thermoplastic molding material as defined in claim 1, wherein the elastomeric grafting base of component B is a copolymer of butylacrylate and butadiene.

6. A thermoplastic molding material as defined in claim 1, wherein (A$_1$) is styrene and (A$_2$) is methyl methacrylate.

7. A thermoplastic molding material as defined in claim 1, wherein (A$_1$) is styrene, (A$_2$) is methyl methacrylate and the elastomeric grafting base of component B is a copolymer of butylacrylate and butadiene.

* * * * *